US012765600B2

(12) United States Patent
Park et al.

(10) Patent No.: US 12,765,600 B2
(45) Date of Patent: Oct. 20, 2026

(54) AEROSOL GENERATING SYSTEM

(71) Applicant: KT&G CORPORATION, Daejeon (KR)

(72) Inventors: In Su Park, Seoul (KR); Sung Jong Ki, Daejeon (KR); Young Joong Kim, Daejeon (KR); John Tae Lee, Daejeon (KR); Sun Hwan Jung, Daejeon (KR); Eun Mi Jeoung, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 742 days.

(21) Appl. No.: 17/431,982

(22) PCT Filed: Jul. 20, 2020

(86) PCT No.: PCT/KR2020/009518

§ 371 (c)(1),
(2) Date: Aug. 18, 2021

(87) PCT Pub. No.: WO2021/025332

PCT Pub. Date: Feb. 11, 2021

(65) Prior Publication Data

US 2022/0160041 A1 May 26, 2022

(30) Foreign Application Priority Data

Aug. 8, 2019 (KR) ........................ 10-2019-0096910

(51) Int. Cl.

| | |
|---|---|
| *A24F 40/465* | (2020.01) |
| *A24D 3/17* | (2020.01) |
| *A24F 40/20* | (2020.01) |
| *H05B 6/10* | (2006.01) |

(52) U.S. Cl.
CPC .............. *A24F 40/465* (2020.01); *A24D 3/17* (2020.01); *A24F 40/20* (2020.01); *H05B 6/105* (2013.01)

(58) Field of Classification Search
CPC ................................ A24F 40/465; A24D 3/17
See application file for complete search history.

(56) References Cited

U.S. PATENT DOCUMENTS 10,842,198 B2 11/2020 Mironov et al.
11,019,848 B2 6/2021 Rojo-Calderon
(Continued)

FOREIGN PATENT DOCUMENTS

JP 2018-529311 A 10/2018
JP 2018-529324 A 10/2018
(Continued)

OTHER PUBLICATIONS

Extended European Search Report dated Mar. 3, 2022, issued in European Application No. 20849875.8.
(Continued)

*Primary Examiner* — Katelyn W Smith
*Assistant Examiner* — Jennifer A Kessie
(74) *Attorney, Agent, or Firm* — Sughrue Mion, PLLC

(57) ABSTRACT

An aerosol generating system includes: a cavity accommodating at least a portion of a cigarette; and an induction coil located around the cavity to generate an alternating magnetic field, wherein a first susceptor and a second susceptor arranged in series along a longitudinal direction of the cavity are heated at different temperatures by the induction coil to heat the cigarette.

5 Claims, 8 Drawing Sheets

(56) References Cited

U.S. PATENT DOCUMENTS

| | | | |
|---|---|---|---|
| 11,083,213 B2 | 8/2021 | Malgat et al. | |
| 2016/0021934 A1 | 1/2016 | Cadieux et al. | |
| 2017/0055582 A1* | 3/2017 | Blandino | H05B 1/0291 |
| 2017/0055583 A1* | 3/2017 | Blandino | A24D 1/20 |
| 2017/0095003 A1 | 4/2017 | Mironov | |
| 2018/0192700 A1 | 7/2018 | Fraser et al. | |
| 2018/0325179 A1 | 11/2018 | Li et al. | |
| 2019/0182909 A1 | 6/2019 | Fursa et al. | |
| 2020/0022412 A1* | 1/2020 | Abi Aoun | G01K 7/16 |
| 2020/0029618 A1 | 1/2020 | Fraser et al. | |
| 2020/0245683 A1* | 8/2020 | Batista | H05B 6/108 |
| 2021/0127738 A1* | 5/2021 | Gill | A24F 40/50 |

FOREIGN PATENT DOCUMENTS

| | | | | |
|---|---|---|---|---|
| JP | 2019-512235 A | 5/2019 | | |
| KR | 10-2018-0040522 A | 4/2018 | | |
| KR | 10-2018-0073626 A | 7/2018 | | |
| WO | 2018/138072 A1 | 8/2018 | | |
| WO | 2018/178219 A1 | 10/2018 | | |
| WO | WO-2018206616 A1 * | 11/2018 | | A24B 15/167 |
| WO | WO-2019030000 A1 * | 2/2019 | | A24F 40/465 |
| WO | 2019073239 A1 | 4/2019 | | |
| WO | 2019/219740 A1 | 11/2019 | | |

OTHER PUBLICATIONS

Notification of Reasons for Refusal dated Dec. 6, 2022 from the Japanese Office Action in Application No. 2021-560669.

Office Action issued from Korean Patent Application No. 10-2019-0096910 issued on May 20, 2021.

International Search Report for PCT/KR2020/009518 dated Nov. 5, 2020 (PCT/ISA/210).

Written Opinion for PCT/KR2020/009518 dated Nov. 5, 2020 (PCT/ISA/237).

* cited by examiner

AEROSOL GENERATING SYSTEM

CROSS REFERENCE TO RELATED APPLICATIONS

This application is a National Stage of International Application No. PCT/KR2020/009518 filed Jul. 20, 2020, claiming priority based on Korean Patent Application No. 10-2019-0096910 filed Aug. 8, 2019.

TECHNICAL FIELD

One or more embodiments relate to an aerosol generating system.

BACKGROUND ART

Recently, there is an increase in demand for alternatives to traditional combustive cigarettes. For example, there is growing demand for aerosol generating devices which generate aerosol by heating an aerosol generating material, rather than by combusting cigarettes.

Recently, an induction heating method using an induction coil and a susceptor is widely used to heat an aerosol generating material. Also, some aerosol generating devices generate aerosol by simultaneously heating a plurality of materials and/or a plurality of areas of a cigarette to improve a taste and/or amount of vapor.

Therefore, there is a need for a technique for heating a plurality of materials and/or a plurality of areas of a cigarette at different temperatures by using an induction heating method.

DISCLOSURE

Technical Solution

According to one or more embodiments, an aerosol generating system may include: a cavity accommodating at least a portion of a cigarette; and an induction coil located around the cavity to generate an alternating magnetic field, wherein a first susceptor and a second susceptor located along a longitudinal direction of the cavity are heated at different temperatures by the induction coil to heat the cigarette.

The first and second susceptors may be included in a cigarette. In this case, the cigarette may include: a nicotine transfer section including a first susceptor; a nicotine generating section connected to a downstream end of the nicotine transfer section and including a second susceptor; and a filter unit connected to a downstream end of the nicotine generating section.

Advantageous Effects

According to one or more embodiments, a plurality of materials and/or a plurality of areas of a cigarette may be heated at different temperatures by an induction heating method using a single induction coil and a plurality of susceptors formed of different materials or having different specifications.

BEST MODE

Figure 1:
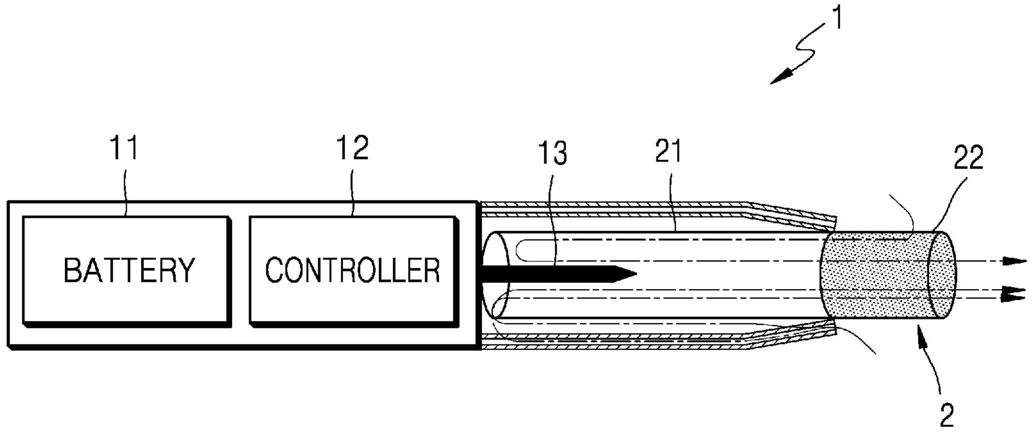
FIGS. 1 through 3 are diagrams showing examples in which a cigarette is inserted into an aerosol generating device.

According to one or more embodiments, an aerosol generating system may include: a cavity that accommodates at least a portion of a cigarette; an induction coil located around the cavity and configured to generate an alternating magnetic field; and a plurality of susceptors configured to be heated at different temperatures by the alternating magnetic field.

Mode for Invention

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used may be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

In the following embodiments, the terms "upstream" and "downstream" may indicate relative locations of segments constituting a cigarette. A cigarette includes an upstream end (i.e., a portion through which air is introduced) and a downstream end (i.e., a portion through which air is discharged) opposite to the upstream end. When using the cigarette, a user may hold the downstream end by the mouth.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, one or more embodiments will be described in detail with reference to the accompanying drawings.

Figure 2:
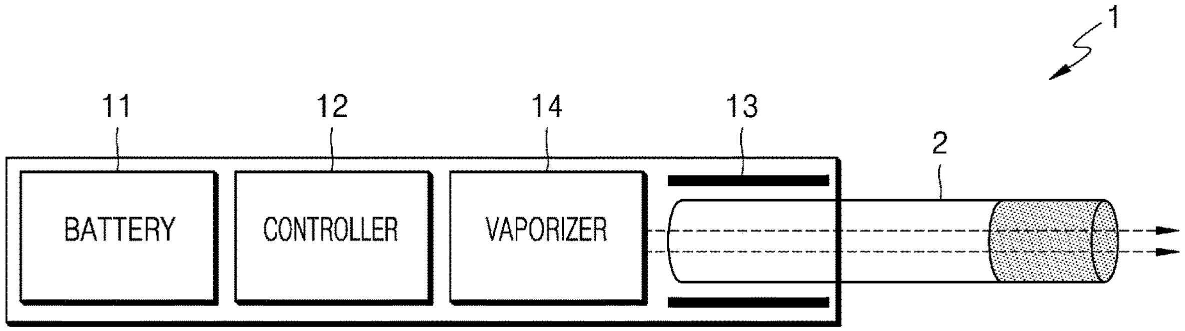
Figure 3:
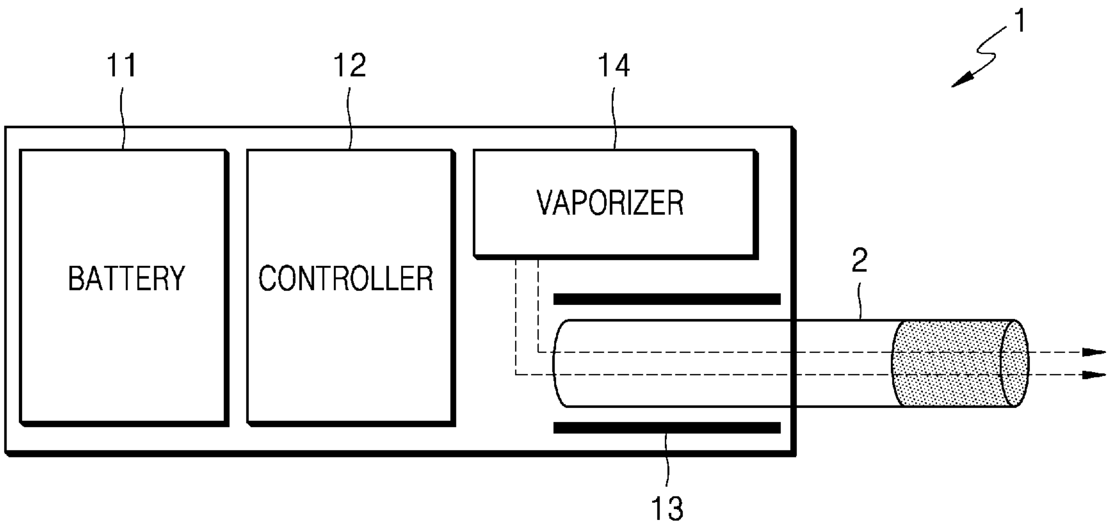

FIGS. 1 through 3 are diagrams showing examples in which a cigarette is inserted into an aerosol generating device.

Referring to FIG. 1, the aerosol generating device 1 may include a battery 11, a controller 12, and a heater 13. Referring to FIGS. 2 and 3, an aerosol generating device 1 further includes a vaporizer 14. Also, a cigarette 2 may be inserted into an inner space of the aerosol generating device 1.

FIGS. 1-3 only illustrate certain components of the aerosol generating device 1, which are related to the present embodiment. Therefore, it will be understood by one of ordinary skill in the art related to the present embodiment that other general-purpose components may be further included in the aerosol generating device 1, in addition to the components illustrated in FIG. 1-3.

Also, FIGS. 2 and 3 illustrate that the aerosol generating device 1 includes the heater 13. However, as necessary, the heater 13 may be omitted.

FIG. 1 illustrates that the battery 11, the controller 12, and the heater 13 are arranged in series. Also, FIG. 2 illustrates that the battery 11, the controller 12, the vaporizer 14, and the heater 13 are arranged in series. Also, FIG. 3 illustrates that the vaporizer 14 and the heater 13 are arranged in parallel. However, the internal structure of the aerosol generating device 1 is not limited to the structures illustrated in FIGS. 1-3. In other words, according to the design of the aerosol generating device 1, the battery 11, the controller 12, the vaporizer 14, and the heater 13 may be differently arranged.

When the cigarette 2 is inserted into the aerosol generating device 1, the aerosol generating device 1 may operate the heater 13 and/or the vaporizer 14 to generate aerosol. The aerosol generated by the heater 13 and/or the vaporizer 14 is delivered to the user by passing through the cigarette 2.

As necessary, even when the cigarette 2 is not inserted into the aerosol generating device 1, the aerosol generating device 1 may heat the heater 13.

The battery 11 may supply power to be used for the aerosol generating device 1 to operate. For example, the battery 11 may supply power to heat the heater 13 or the vaporizer 14 and may supply power for operating the controller 12. Also, the battery 11 may supply power for operations of a display, a sensor, a motor, etc. mounted in the aerosol generating device 1.

The controller 12 may generally control operations of the aerosol generating device 1. In detail, the controller 12 may control not only operations of the battery 11, the heater 13, and the vaporizer 14, but also operations of other components included in the aerosol generating device 1. Also, the controller 12 may check a state of each of the components of the aerosol generating device 1 to determine whether or not the aerosol generating device 1 is able to operate.

The controller 12 may include at least one processor. A processor can be implemented as an array of a plurality of logic gates or can be implemented as a combination of a microprocessor and a memory in which a program executable in the microprocessor is stored. It will be understood by one of ordinary skill in the art that the processor can be implemented in other forms of hardware.

The heater 13 is heated by power supplied from the battery 11. For example, when the cigarette 2 is inserted into the aerosol generating device 1, the heater 13 may be located inside or outside the cigarette 2. Thus, the heated heater 13 may increase a temperature of an aerosol generating material in the cigarette 2.

The heater 13 may include an electro-resistive heater. For example, the heater 13 may include an electrically conductive track, and the heater 13 may be heated when currents flow through the electrically conductive track. However, the heater 13 is not limited to the example described above and may include all heaters which may be heated to a desired temperature. Here, the desired temperature may be pre-set in the aerosol generating device 1 or may be set as a temperature desired by a user.

As another example, the heater 13 may include an induction heater. In detail, the heater 13 may include an electrically conductive coil for heating a cigarette in an induction heating method, and the cigarette may include a susceptor which may be heated by the induction heater.

For example, the heater 13 may include a tube-type heating element, a plate-type heating element, a needle-type heating element, or a rod-type heating element, and may heat the inside or the outside of the cigarette 2, according to the shape of the heating element.

Also, the aerosol generating device 1 may include a plurality of heaters 13. Here, the plurality of heaters 13 may be inserted into the cigarette 2 or may be arranged outside the cigarette 2. Also, some of the plurality of heaters 13 may be inserted into the cigarette 2, and the others may be arranged outside the cigarette 2. In addition, the shape of the heater 13 is not limited to the shape illustrated in FIGS. 1-3, and may include various shapes.

The vaporizer 14 may generate aerosol by heating a liquid composition and the generated aerosol may pass through the cigarette 2 to be delivered to a user. In other words, the aerosol generated via the vaporizer 14 may move along an air flow passage of the aerosol generating device 1 and the air flow passage may be configured such that the aerosol generated via the vaporizer 14 passes through the cigarette 2 to be delivered to the user.

For example, the vaporizer 14 may include a liquid storage, a liquid delivery element, and a heating element, but it is not limited thereto. For example, the liquid storage, the liquid delivery element, and the heating element may be included in the aerosol generating device 1 as independent modules.

The liquid storage may store a liquid composition. For example, the liquid composition may be a liquid including a tobacco-containing material having a volatile tobacco flavor component, or a liquid including a non-tobacco material. The liquid storage may be formed to be detachable from the vaporizer 14 or may be formed integrally with the vaporizer 14.

For example, the liquid composition may include water, a solvent, ethanol, plant extract, spices, flavorings, or a vitamin mixture. The spices may include menthol, peppermint, spearmint oil, and various fruit-flavored ingredients, but are not limited thereto. The flavorings may include ingredients capable of providing various flavors or tastes to a user.

Vitamin mixtures may be a mixture of at least one of vitamin A, vitamin B, vitamin C, and vitamin E, but are not limited thereto. Also, the liquid composition may include an aerosol forming substance, such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element for heating the liquid composition delivered by the liquid delivery element. For example, the heating element may be a metal heating wire, a metal hot plate, a ceramic heater, or the like, but is not limited thereto. In addition, the heating element may include a conductive filament such as nichrome wire and may be positioned as being wound around the liquid delivery element. The heating element may be heated by a current supply and may transfer heat to the liquid composition in contact with the heating element, thereby heating the liquid composition. As a result, aerosol may be generated.

For example, the vaporizer 14 may be referred to as a cartomizer or an atomizer, but it is not limited thereto.

The aerosol generating device 1 may further include other components in addition to the battery 11, the controller 12, the heater 13, and the vaporizer 14. For example, the aerosol generating device 1 may include a display capable of outputting visual information and/or a motor for outputting haptic information. Also, the aerosol generating device 1 may include at least one sensor (e.g., a puff detecting sensor, a temperature detecting sensor, a cigarette insertion detecting sensor, etc.). Also, the aerosol generating device 1 may be formed as a structure where, even when the cigarette 2 is inserted into the aerosol generating device 1, external air may be introduced or internal air may be discharged.

Although not illustrated in FIGS. 1-3, the aerosol generating device 1 and an additional cradle may form together a system. For example, the cradle may be used to charge the battery 11 of the aerosol generating device 1. Alternatively, the heater 13 may be heated when the cradle and the aerosol generating device 1 are coupled to each other.

The cigarette 2 may be similar to a general combustive cigarette. For example, the cigarette 2 may be divided into a first portion including an aerosol generating material and a second portion including a filter, etc. Alternatively, the second portion of the cigarette 2 may also include an aerosol generating material. For example, an aerosol generating material made in the form of granules or capsules may be inserted into the second portion.

The entire first portion may be inserted into the aerosol generating device 1, and the second portion may be exposed to the outside. Alternatively, only a portion of the first portion may be inserted into the aerosol generating device 1, or a portion of the first portion and a portion of the second portion may be inserted into the aerosol generating device 1. The user may puff aerosol while holding the second portion by the mouth of the user. In this case, the aerosol is generated by the external air passing through the first portion, and the generated aerosol passes through the second portion and is delivered to the user's mouth.

For example, the external air may flow into at least one air passage formed in the aerosol generating device 1. For example, opening and closing of the air passage and/or a size of the air passage may be adjusted by the user. Accordingly, the amount and quality of vapor may be adjusted by the user. As another example, the external air may flow into the cigarette 2 through at least one hole formed in a surface of the cigarette 2.

Figure 4:
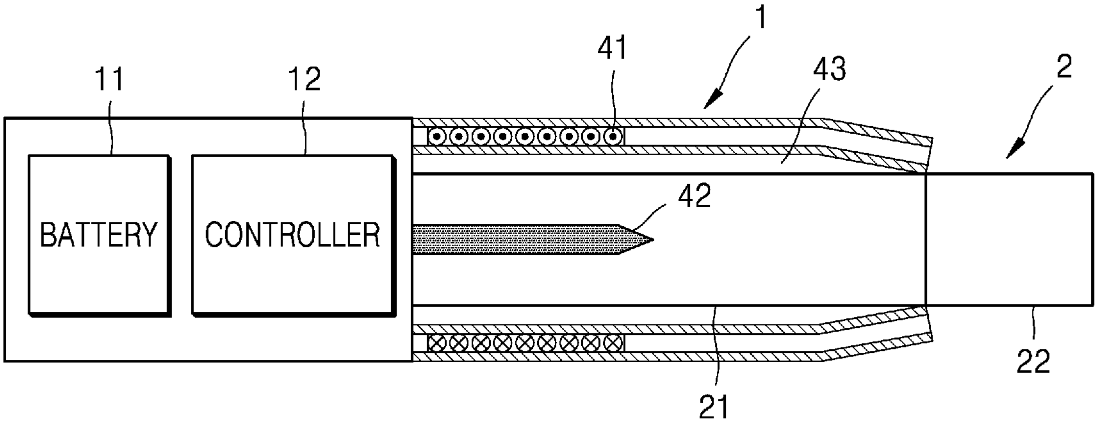
FIG. 4 is a view illustrating an example of an aerosol generating system using an induction heating method, according to an embodiment.

FIG. 4 is a view illustrating an example of an aerosol generating system using an induction heating method, according to an embodiment.

Referring to FIG. 4, an aerosol generating device 1 includes a battery 11, a controller 12, an induction coil 41, and a susceptor 42. Also, at least a portion of a cigarette 2 may be accommodated in a cavity 43 of the aerosol generating device 1.

The aerosol generating device 1 illustrated in FIG. 4 shows elements related to the present embodiment. Therefore, it will be understood by one of ordinary skill in the art related to the present embodiment that the aerosol generating device 1 may further include other elements in addition to the elements illustrated in FIG. 4.

The induction coil 41 may be located around the cavity 43. FIG. 4 illustrates that the induction coil 41 is arranged to surround the susceptor 42 and the cavity 43 but is not limited thereto.

When the cigarette 2 is accommodated in the cavity 43 of the aerosol generating device 1, the aerosol generating device 1 may supply power to the induction coil 41 such that the induction coil 41 may generate an alternating magnetic field. As the alternating magnetic field generated by the induction coil 41 passes through the susceptor 42, the susceptor 42 may be heated. An aerosol generating material in the cigarette 2 may be heated by the heated susceptor 42 such that aerosol may be generated. The generated aerosol passes through the cigarette 2 and is delivered to a user.

The battery 11 supplies power used to operate the aerosol generating device 1. For example, the battery 11 may supply power such that the induction coil 41 may generate the alternating magnetic field and may supply power needed for operating the controller 12. Also, the battery 11 may supply power needed for operating a display, a sensor, a motor, and the like installed in the aerosol generating device 1.

The controller 12 controls an overall operation of the aerosol generating device 1. In detail, the controller 12 controls operations of other elements included in the aerosol generating device 1, as well as operations of the battery 11 and the induction coil 41. Also, the controller 12 may determine whether or not the aerosol generating device 1 is in an operable state by checking states of respective elements of the aerosol generating device 1.

The induction coil 41 may be an electrically conductive coil that generates an alternating magnetic field by power supplied from the battery 11. The induction coil 41 may be arranged to surround at least a portion of the cavity 43. The alternating magnetic field generated by the induction coil 41 may be applied to the susceptor 42 arranged at an inner end of the cavity 43.

The susceptor 42 may be heated as the alternating magnetic field generated by the induction coil 41 passes through the susceptor 42 and may include metal or carbon. For example, the susceptor 42 may include at least one of ferrite, a ferromagnetic alloy, stainless steel, and aluminum.

Also, the susceptor 42 may include at least one of graphite, molybdenum, silicon carbide, niobium, a nickel alloy, a metal film, ceramic such as zirconia, transition metal such as nickel (Ni) or cobalt (Co), and metalloid such as boron (B) or phosphorus (P). However, the susceptor 42 is not limited to the example illustrated above and may include any other susceptors that may be heated to a desired temperature by an alternating magnetic field applied thereto. Here, the desired temperature may be preset in the aerosol generating device 1 or may be set manually by a user.

When the cigarette 2 is accommodated in the cavity 43 of the aerosol generating device 1, the susceptor 42 may be located inside the cigarette 2. Therefore, the heated susceptor 42 may raise a temperature of the aerosol generating material in the cigarette 2.

FIG. 4 illustrates that the susceptor 42 is inserted into the cigarette 2 but is not limited thereto. For example, the susceptor 42 may include a tube-type heating element, a plate-type heating element, a needle-type heating element, or a rod-type heating element and may heat an inside or an outside of the cigarette 2 according to a shape of a heating element.

Also, the aerosol generating device 1 may include a plurality of susceptors 42 arranged therein. Here, the plurality of susceptors 42 may be arranged to be inserted into the cigarette 2 or may be arranged outside the cigarette 2. Also, some of the plurality of susceptors 42 may be arranged to be inserted into the cigarette 2, and the others may be arranged outside the cigarette 2. The shape of the susceptor 42 is not limited to the shape illustrated in FIG. 4 and may be manufactured in various shapes.

Figure 5:
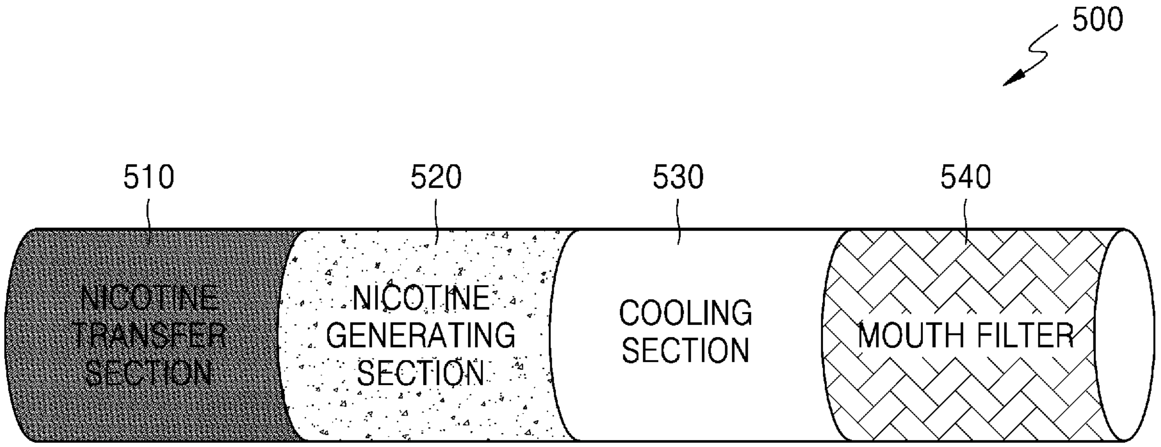
FIG. 5 is a view illustrating an example of a cigarette according to an embodiment.

FIG. 5 is a view illustrating an example of a cigarette according to an embodiment.

Referring to FIG. 5, a cigarette 500 includes a nicotine transfer section 510, a nicotine generating section 520, and a filter unit. The filter unit includes a cooling section 530 and a mouth filter 540. As needed, the filter unit may further include a segment performing another function.

The nicotine transfer section 510 includes an aerosol generating material. The nicotine transfer section 510 may include at least one of glycerin, propylene glycol, ethylene glycol, dipropylene glycol, diethylene glycol, triethylene glycol, tetraethylene glycol, and oleyl alcohol but is not limited thereto. The nicotine transfer section 510 may be heated such that aerosol may be generated.

The nicotine generating section 520 includes a tobacco material including nicotine. The nicotine generating section 520 may include a tobacco material such as tobacco leaves, a reconstituted tobacco, and tobacco granules. The nicotine generating section 520 may be formed as a sheet, a strand, or a pipe tobacco which is formed of tiny bits cut from a tobacco sheet.

The cooling section 530 cools aerosol generated by heating at least one of the nicotine transfer section 510 and the nicotine generating section 520. Therefore, a user may puff the aerosol at an appropriate temperature.

In an embodiment, the cooling section 530 may be a hollow-type cellulose acetate filter. In another embodiment, the cooling section 530 may be a filter formed of a polymer fiber. The cooling section 530 may be formed of a woven polymer fiber or a crimped polymer sheet. For example, the polymer may be formed of a material selected from the group consisting of polyethylene (PE), polypropylene (PP), polyvinyl chloride (PVC), polyethylene terephthalate (PET), polylactic acid (PLA), cellulose acetate (CA), and aluminum foil.

The mouth filter 540 may be a cellulose acetate filter.

The mouth filter 540 may be a cylindrical type or a tube type having a hollow inside. Also, the mouth filter 540 may be a recessed type.

In addition, the mouth filter 540 may include at least one capsule. The capsule may generate a flavor and/or aerosol. For example, the capsule may have a configuration in which a liquid including a flavoring material is wrapped with a film. The capsule may have a spherical or cylindrical shape but is not limited thereto.

The aerosol generated by the nicotine transfer section 510 and the nicotine generating section 520 is cooled by passing through the cooling section 530, and the cooled aerosol is delivered to the user through the mouth filter 540. Therefore, when a flavoring element is added to the mouth filter 540, the persistence of flavors delivered to the user may be enhanced.

Although not illustrated in FIG. 5, the cigarette 500 may be packaged by at least one wrapper. The wrapper may have at least one hole through which external air may be introduced or internal air may be discharged. As an example, the cigarette 500 may be packaged by one wrapper. As another example, the cigarette 500 may be doubly packaged by two or more wrappers.

Figure 6A:
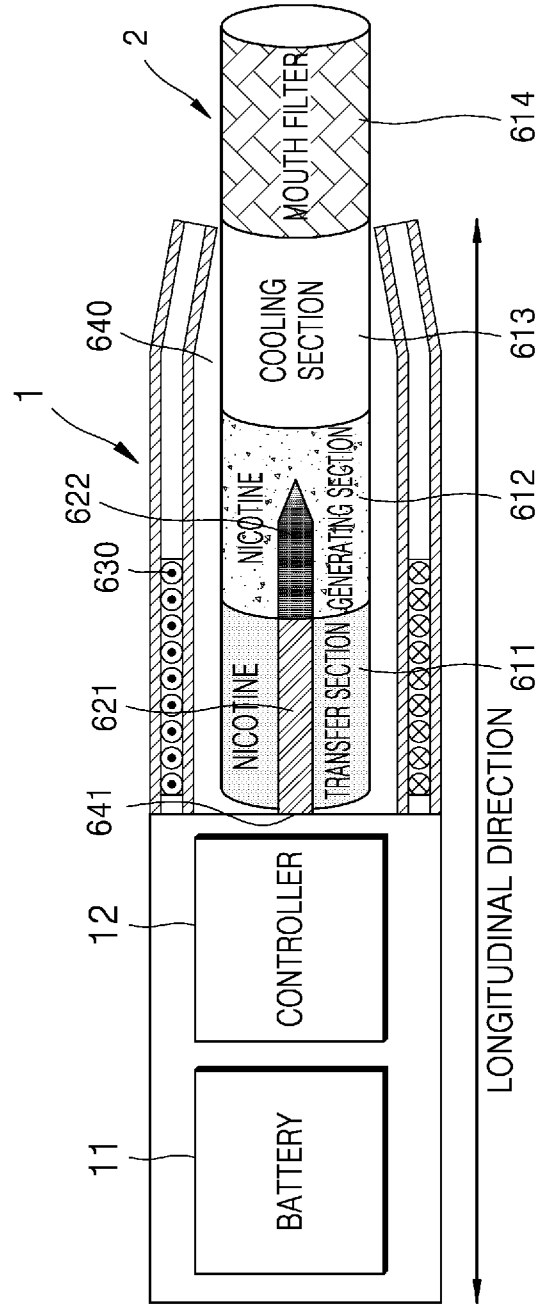
FIGS. 6A and 6B are views illustrating an example of an aerosol generating system including a plurality of susceptors, according to an embodiment.
Figure 6B:
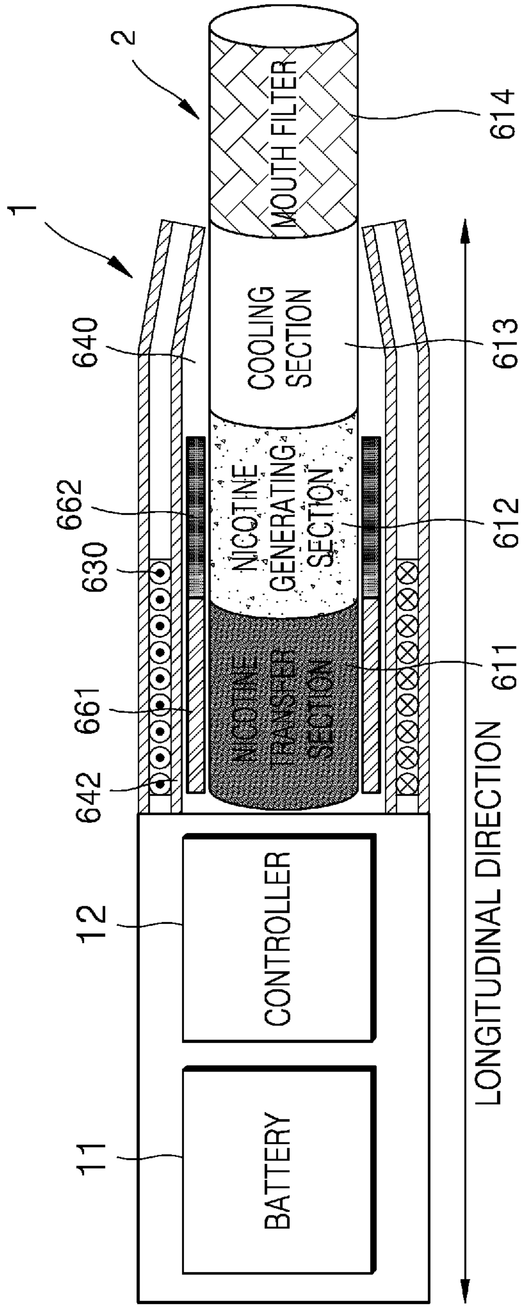

FIGS. 6A and 6B are views illustrating an example of an aerosol generating system including a plurality of susceptors, according to an embodiment.

The aerosol generating system includes an aerosol generating device 1 and a cigarette 2.

The aerosol generating device 1 may include a battery 11, a controller 12, an induction coil 630, a first susceptor 621, a second susceptor 622, and a cavity 640. The cigarette 2 may include a nicotine transfer section 611, a nicotine generating section 612, a cooling section 613, and a mouth filter 614. However, it will be understood by one of ordinary skill in the art related to the present embodiment that other elements may be further included in addition to the elements illustrated in FIGS. 6A and 6B.

When the cigarette 2 is accommodated in the cavity 640 of the aerosol generating device 1, the aerosol generating device 1 may supply power to the induction coil 630 from the battery 11 such that the induction coil 630 may generate an alternating magnetic field. As the alternating magnetic field generated by the induction coil 630 passes through the first susceptor 621 and the second susceptor 622, the first susceptor 621 and the second susceptor 622 may respectively heat the nicotine transfer section 611 and the nicotine generating section 612.

FIG. 6A illustrates the aerosol generating system including the first susceptor 621 and the second susceptor 622 that are elongated and arranged in series along the longitudinal direction of the cigarette 2.

The first susceptor 621 and the second susceptor 622 may be part of the aerosol generating device 1. The first susceptor 621 and the second susceptor 622 may extend along a longitudinal direction of the cavity 640 from a support portion 641 formed at an inner end of the cavity 640, as illustrated in FIG. 6A.

The cigarette 2 may include the nicotine transfer section 611 and the nicotine generating section 612 connected to a downstream end of the nicotine transfer section 611.

The nicotine transfer section 611 includes a moisturizer (e.g., glycerin, propylene glycol, or the like), and aerosol may be generated as the nicotine transfer section 611 is heated. The nicotine generating section 612 includes a tobacco material (e.g., tobacco leaves, a reconstituted tobacco, tobacco granules, or the like) including nicotine, and nicotine is generated as the nicotine generating section 612 is heated.

Since materials included in the nicotine transfer section 611 and the nicotine generating section 612 are different from each other, heating temperatures of the nicotine transfer section 611 and the nicotine generating section 612 for providing a user with a best tobacco taste may be different.

When the cigarette 2 is accommodated in the cavity 640 of the aerosol generating device 1, the first susceptor 621 and the second susceptor 622 may be inserted into the cigarette 2. In this case, the first susceptor 621 may be located inside the nicotine transfer section 611, and the second susceptor 622 may be located inside the nicotine generating section 612.

To heat the nicotine transfer section 611 and the nicotine generating section 612 at different temperatures, heating temperatures of the first susceptor 621 and the second susceptor 622 may be different.

In an embodiment, the first susceptor 621 and the second susceptor 622 may be formed of different materials. For example, the first susceptor 621 may be formed of ferrite, and the second susceptor 622 may be formed of stainless steel.

Alternatively, the first susceptor 621 and the second susceptor 622 may be formed of the same material having different specifications. The specifications may include length, thickness, density, mass, volume, and the like of susceptors, but are not limited thereto. For example, both the first susceptor 621 and the second susceptor 622 may be formed of SUS3 series, but lengths and/or thickness of the first susceptor 621 and the second susceptor 622 may be different from each other.

Since the first susceptor 621 and the second susceptor 622 are formed of different materials or the same material having different specifications, when the alternating magnetic field generated by the single induction coil 630 passes through the first susceptor 621 and the second susceptor 622, heating temperatures of the first susceptor 621 and the second susceptor 622 may be different.

For example, a temperature at which the first susceptor 621 heats the nicotine transfer section 611 may be 30° C. to 100° C. higher than a temperature at which the second susceptor 622 heats the nicotine generating section 612. Alternatively, the temperature at which the first susceptor 621 heats the nicotine transfer section 611 may be 50° C. to 80° C. higher than the temperature at which the second susceptor 622 heats the nicotine generating section 612.

For example, the nicotine transfer section 611 may be heated at 180° C. to 250° C. by the first susceptor 621, and the nicotine generating section 612 may be heated at 150° C. to 200° C. by the second susceptor 622.

However, optimal heating temperatures of the nicotine transfer section 611 and the nicotine generating section 612 may vary according to a type, a composition ratio, and the like of a material constituting each segment.

In an embodiment, the first susceptor 621 and the second susceptor 622 may be part of the cigarette 2. For example, the nicotine transfer section 611 and the nicotine generating section 612 of the cigarette 2 may respectively include therein the first susceptor 621 and the second susceptor 622 that are elongated. The first susceptor 621 and the second susceptor 622 may extend along a longitudinal direction of the cigarette 2.

In the case where the first susceptor 621 and the second susceptor 622 are included in the cigarette 2, the first susceptor 621 and the second susceptor 622 may be connected to each other to form a single heating body or may be separated from each other to be respectively located inside the nicotine transfer section 611 and the nicotine generating section 612.

FIG. 6B illustrates an aerosol generating system including a first susceptor 661 and a second susceptor 662 that are cylindrical.

Hereinafter, for convenience of description, the same description of FIG. 6B as that of FIG. 6A will be omitted.

The first susceptor 661 and the second susceptor 662 may be part of the aerosol generating device 1. The first susceptor 661 and the second susceptor 662 may extend in a longitudinal direction of a cavity 640 along an inner wall 642 forming the cavity 640, as illustrated in FIG. 6B.

When a cigarette 2 is accommodated in the cavity 640 of the aerosol generating device 1, the first susceptor 661 and the second susceptor 662 may be located to surround an outside of the cigarette 2. Here, the first susceptor 661 may be located at a position corresponding to a nicotine transfer section 611, and the second susceptor 662 may be located at a position corresponding to a nicotine generating section 662.

To heat the nicotine transfer section 611 and the nicotine generating section 612 at different temperatures, heating temperatures of the first susceptor 661 and the second susceptor 662 may be different.

In an embodiment, the first susceptor 661 and the second susceptor 662 may be formed of different materials or the same material having different specifications, so that the first susceptor 661 and the second susceptor 662 may be heated at different temperatures when an alternating magnetic field generated by a single induction coil 630 passes through the first susceptor 661 and the second susceptor 662.

In an embodiment, the first susceptor 661 and the second susceptor 662 may be part of the cigarette 2. The first susceptor 661 and the second susceptor 662 may extend along an outer surface of the cigarette 2. For example, the first susceptor 661 and the second susceptor 662 may be located to respectively surround the nicotine transfer section 611 and the nicotine generating section 612. Also, the first susceptor 661 and the second susceptor 662 may be packaged by at least one wrapper.

In the case where the first susceptor 661 and the second susceptor 662 are part of the cigarette 2, the first susceptor 661 and the second susceptor 662 may be connected to each other to form a single heating body or may be separated from each other to be respectively located at positions corresponding to the nicotine transfer section 611 and the nicotine generating section 612.

Figure 7:
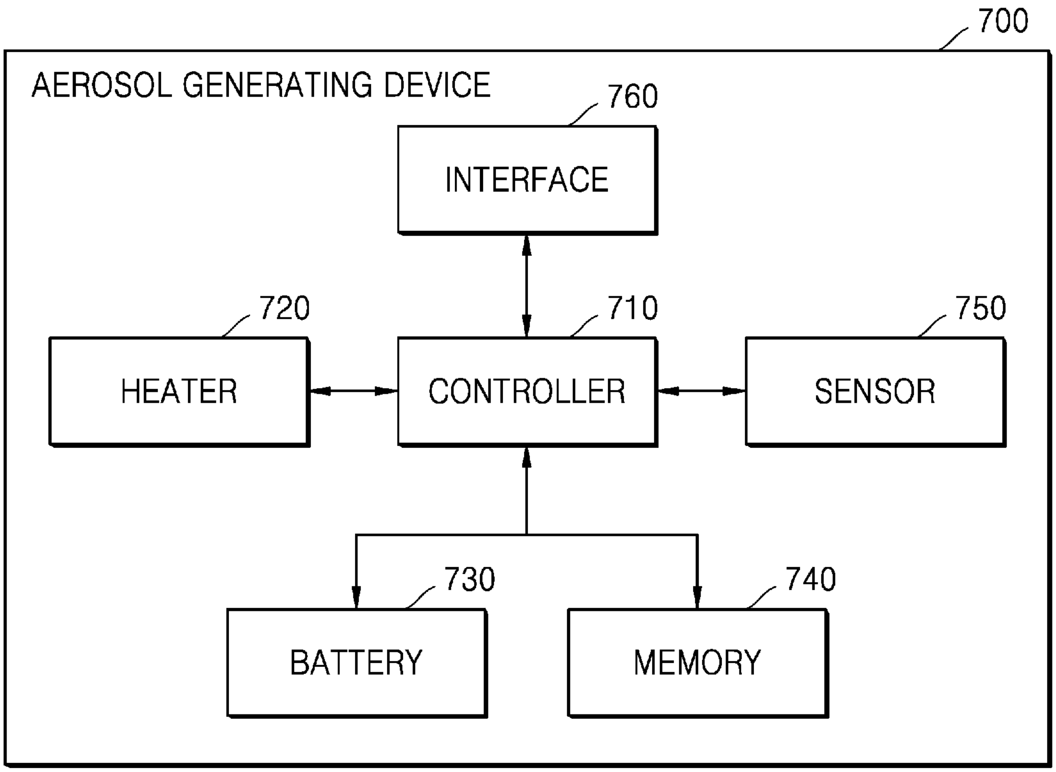
FIG. 7 is a block diagram illustrating a hardware configuration of an aerosol generating device according to an embodiment.

FIG. 7 is a block diagram illustrating a hardware configuration of an aerosol generating device according to an embodiment.

Referring to FIG. 7, an aerosol generating device 700 may include a controller 710, a heater 720, a battery 730, a memory 740, a sensor 750, and an interface 760. However, an internal structure of the aerosol generating device 700 is not limited to the example illustrated in FIG. 7. It will be understood by one of ordinary skill in the art related to the present embodiment that, according to a design of the aerosol generating device 700, some of the hardware configuration illustrated in FIG. 7 may be omitted or new elements may be further added.

The heater 720 is electrically heated by power supplied from the battery 730 under control of the controller 710. The heater 720 is located inside an accommodation passage of the aerosol generating device 700 accommodating a cigarette. As the cigarette is inserted through an insertion hole of the aerosol generating device 700 from the outside and then moves along the accommodation passage, one end of the cigarette may be inserted into the heater 720. Therefore, the heated heater 720 may raise a temperature of an aerosol generating material in the cigarette. The heater 720 may include any types of heaters that may be inserted into a cigarette.

The heater 720 may include a heat source and a heat transfer object. For example, the heat source of the heater 720 may be manufactured in a film shape having an electro-resistive pattern, and the film-shaped heater 720 may be arranged to surround at least a portion of an outer surface of the heat transfer object (e.g., a heat transfer tube).

The heat transfer object may include a metal material capable of transferring heat, such as aluminum or stainless steel, an alloy material, a carbon or ceramic material, or the like. When power is supplied to the electro-resistive pattern of the heater 720, heat may be generated, and the generated heat may heat the aerosol generating material through the heat transfer object.

The aerosol generating device 700 may include an additional temperature detecting sensor. Alternatively, instead of including the additional temperature detecting sensor, the heater 720 may also function as a temperature detecting sensor. Alternatively, while the heater 720 may function as a temperature detecting sensor, the aerosol generating device 700 may further include an additional temperature detecting sensor. A temperature detecting sensor may be arranged on the heater 720 in the form of a conductive track or element.

For example, when a voltage across the temperature detecting sensor and a current flowing through the temperature detecting sensor are measured, resistance R may be determined. Here, the temperature detecting sensor may measure a temperature T by Equation 1 below:

$$R=R_0\{1+\alpha(T-T_0)\} \quad (1)$$

wherein R denotes a current resistance value of the temperature detecting sensor, R0 denotes a resistance value at a temperature T0 (e.g., 0° C.), and a denotes a resistance temperature coefficient of the temperature detecting sensor. Since a conductive material (e.g., metal) has a unique resistance temperature coefficient, a may be preset according to a conductive material constituting the temperature detecting sensor. Therefore, once the resistance R of the temperature detecting sensor is determined, the temperature T of the temperature detecting sensor may be calculated by Equation 1 above.

The controller 710 is hardware controlling an overall operation of the aerosol generating device 700. The controller 710 is an integrated circuit that is embodied as a processing unit such as a microprocessor or a microcontroller.

The controller 710 analyzes a sensing result from the sensor 750 and controls processes to be subsequently processed. The controller 710 may start or stop supplying power to the heater 720 from the battery 730 according to the sensing result. Also, the controller 710 may control the amount of power supplied to the heater 720 and a time when power is supplied to the heater 720 such that the heater 720 may be heated to a preset temperature or may maintain an appropriate temperature. In addition, the controller 710 may process various types of input information and output information of the interface 760.

The controller 710 may control smoking-related functions of the aerosol generating device 700 to count the number of puffs taken on the aerosol generating device 700 and limit smoking of the user according to the counting result.

The memory 740 may be hardware storing various types of data processed in the aerosol generating device 700. The memory 740 may store pieces of data processed by the controller 710 and pieces of data to be processed by the controller 710. The memory 740 may be embodied as various types, such as random access memory (RAM) such as dynamic random access memory (DRAM) and static random access memory (SRAM), read-only memory (ROM), and electrically erasable programmable read-only memory (EEPROM).

The memory 740 may store data about a smoking pattern of a user such as a smoking time and the number of smoking. Also, the memory 740 may store data related to a change value of a reference temperature when the cigarette is accommodated in the accommodation passage.

In addition, the memory 740 may store a plurality of temperature correction algorithms.

The battery 730 supplies power used to operate the aerosol generating device 700. In other words, the battery 730 may supply power such that the heater 720 may be heated. Also, the battery 730 may supply power needed for operations of other pieces of hardware, the controller 710, the sensor 750, and the interface 760 provided in the aerosol generating device 700. The battery 730 may be a lithium iron phosphate ($LiFePO_4$) battery but is not limited thereto, and thus may be formed as a lithium cobalt oxide ($LiCoO_2$) battery, a lithium titanate battery, or the like. The battery 730 may be a rechargeable battery or a disposable battery.

The sensor 750 may include various types of sensors such as a puff detecting sensor (e.g., a temperature detecting sensor, a flow detecting sensor, a position detecting sensor, or the like), a cigarette insertion detecting sensor, a temperature detecting sensor of the heater 720, and a cigarette reuse detecting sensor. A sensing result of the sensor 750 may be transmitted to the controller 710, and the controller 710 may control the aerosol generating device 700 to thereby perform various functions, such as controlling a heater temperature, limiting smoking, determining whether or not a cigarette is inserted, displaying a notification, and determining whether or not the cigarette is reused, according to the sensing result.

The interface 760 may include various types of interfacing elements such as a display or lamp outputting visual information, a motor outputting tactile information, a speaker outputting sound information, input/output (I/O) interfacing elements (e.g., a button and a touch screen) receiving information input from the user or outputting information to the user, terminals performing data communication or supplied with charging power, and a communication interfacing module performing wireless communication (e.g., WI-FI, WI-FI Direct, Bluetooth, Near-Field Communication (NFC), or the like) with an external device. However, the aerosol generating device 700 may be embodied by selecting merely some of various interfacing elements illustrated above.

The aerosol generating device 700 may further include a vaporizer (not shown). The vaporizer (not shown) may include a liquid storage, a liquid delivery element, and a heating element heating a liquid.

The liquid storage may store a liquid composition. For example, the liquid composition may be a liquid including a tobacco-including material having a volatile tobacco flavor component or a liquid including a non-tobacco material. The liquid storage may be formed to be detachable from the vaporizer (not shown) or may be formed integrally with the vaporizer (not shown).

For example, the liquid composition may include water, a solvent, ethanol, plant extract, spices, flavorings, or a vitamin mixture. The spices may include menthol, peppermint, spearmint oil, and various fruit-flavored ingredients but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. Also, the liquid composition may include an aerosol forming substance, such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element for heating the liquid composition delivered by the liquid delivery element. For example, the heating element may be a metal heating wire, a metal hot plate, a ceramic heater, or the like, but is not limited thereto. In addition, the heating element may include a conductive filament such as nichrome wire and may be positioned as being wound around the liquid delivery element. The heating element may be heated by a current supply and may transfer heat to the liquid composition in contact with the heating element, thereby heating the liquid composition. As a result, aerosol may be generated.

For example, the vaporizer (not shown) may be referred to as a cartomizer or an atomizer but is not limited thereto.

At least one of the components, elements, modules or units (collectively "components" in this paragraph) represented by a block in the drawings such as the controller 12, the controller 810, and the interface 860 in FIGS. 1-4, 6A, 6B, and 7 may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

The descriptions of the above-described embodiments are merely examples, and it will be understood by one of ordinary skill in the art that various changes and equivalents thereof may be made. Therefore, the scope of the disclosure should be defined by the appended claims, and all differences within the scope equivalent to those described in the claims will be construed as being included in the scope of protection defined by the claims.

What is claimed is:

1. An aerosol generating system comprising:

a cigarette comprising an aerosol generating section and a nicotine generating section connected to a downstream end of the aerosol generating section, wherein the aerosol generating section includes a moisturizer, and the nicotine generating section includes a tobacco material comprising nicotine, wherein materials included in the aerosol generating section and the nicotine generating section are different from each other;

an aerosol generating device comprising:

(i) a cavity that accommodates at least a portion of the cigarette;

(ii) an induction coil located around the cavity and configured to generate an alternating magnetic field; and (iii) a first susceptor and a second susceptor directly connected to an end of the first susceptor such that the first susceptor and the second susceptor are arranged in series along a longitudinal direction of the cavity and configured to be heated by the alternating magnetic field, wherein an end of the second susceptor inserted into the cavity has a thickness that decreases along the longitudinal direction such that the thickness of the end of the second susceptor is less than a thickness of the end of the first susceptor connected to a support portion of the cavity, wherein each portion of the first susceptor is formed of a first material and each portion of the second susceptor is formed of a second material different from the first material, and (iv) the support portion formed at an inner end of the cavity wherein the first susceptor and the second susceptor are heated to different temperatures to have a temperature difference corresponding to a difference between a temperature at which the moisturizer begins to vaporize and a temperature at which the tobacco material begins to vaporize, and wherein a temperature at which the first susceptor heats the aerosol generating section is 30° C. to 100° C. higher than a temperature at which the second susceptor heats the nicotine generating section.

2. The aerosol generating system of claim 1, wherein the first susceptor and the second susceptor are elongated and connected to each other, and extend along the longitudinal direction of the cavity from the support portion.

3. The aerosol generating system of claim 1, wherein the cigarette further comprises a filter unit connected to a downstream end of the nicotine generating section.

4. The aerosol generating system of claim 3, wherein the filter unit comprises:

a cooling section connected to the downstream end of the nicotine generating section; and a mouth filter connected to a downstream end of the cooling section.

5. The aerosol generating system of claim 1, wherein the first material is ferrite and the second material is stainless steel.

* * * * *